Figure 1:
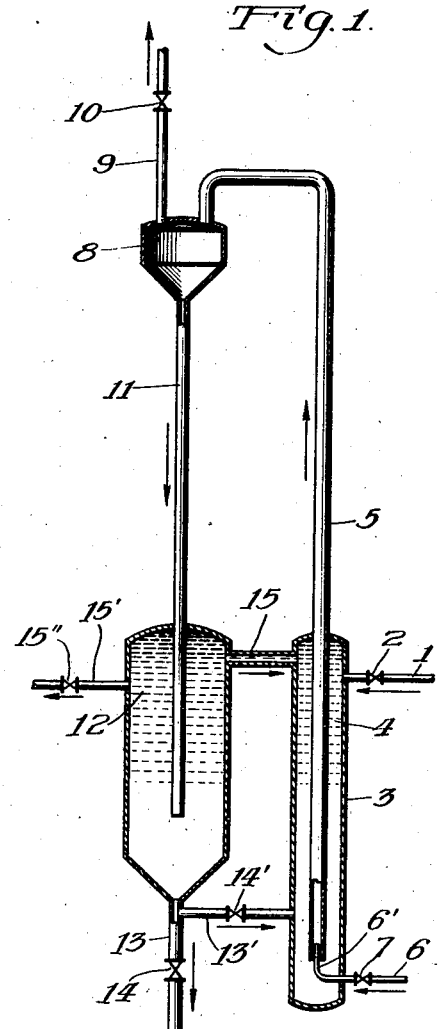

March 27, 1934.  K. M. WATSON  1,952,694

TREATMENT OF HYDROCARBON OILS

Filed Dec, 26, 1931

Inventor:
Kenneth M. Watson
By Frank L. Belknap
Attorney

Patented Mar. 27, 1934

1,952,694

UNITED STATES PATENT OFFICE 1,952,694

TREATMENT OF HYDROCARBON OILS

Kenneth M. Watson, Chicago, Ill., assignor to Universal Oil Products Company, Chicago, Ill., a corporation of South Dakota Application December 26, 1931, Serial No. 583,212

6 Claims. (Cl. 261—77)

This invention relates to contacting liquid and vaporous materials and more particularly refers to an improved means of intimately commingling liquid and vaporous materials and subsequently separating the liquid and vaporous products for the purpose of causing desirable reactions between the said liquid and gases or vapors; e. g. in the treatment of hydrocarbon vapors by polymerizing agents or chemical reagents to refine them.

The invention employs the principles of an injector and a gas-lift pump to secure intimate commingling of vaporous and liquid materials for a predetermined time. Following the period of contact the resulting vaporous and liquid products are separated and all or a selected portion of said resulting liquid may be returned to further contact with fresh vaporous products supplied to said zone of contact or withdrawn, all or in part, from the system.

A more specific embodiment of the apparatus of the present invention may comprise an elongated zone of contact, a closed vessel for maintaining a body of liquid surrounding the inlet end of said contact zone, means for introducing fresh liquid into said vessel, means for injecting vapors at the inlet end of said contact zone beneath the surface of said surrounding body of liquid in such a manner that a mixture of said liquid and vapors is continuously passed upward through the contact zone and the components thereby intimately commingled, a separating zone surrounding the upper end of said contact zone into which the commingled materials are discharged, wherein their vaporous and liquid components are separated and from which they are separately and continuously withdrawn, a settling zone disposed below said separating zone wherein heavy components of the liquid from the separating zone are separated from its lighter components, means for withdrawing said heavy components from the system and means for returning said lighter components to the body of liquid surrounding the inlet end of said contact zone.

The principles of the invention are adaptable to a wide variety of uses and are limited with respect to their utility only to the contacting of liquid or mixtures of liquid with vapors and/or gases.

As an illustration of one specific application of the principles of the present invention, they may be utilized to obtain contact between hydrocarbon vapors and a liquid treating reagent such as acid. The principles of the invention are particularly advantageous in a treating process of this character in that they obtain intimate contact of the hydrocarbon vapors and treating reagent for a predetermined time, permit separation of vaporous and non-vaporous products of the reaction following said contact and further permit the separation of the sludge or other deleterious or undesirable reaction products from said nonvaporous material and the return of any unused portion of the reagent to further contact with fresh vapors. All of these steps may be accomplished in a single relatively compact piece of equipment. Use of the apparatus of the present invention may also dispense with pumps, blow cases and the like for handling the acid or other corrosive treating reagent which is a distinct advantage over existing treating apparatus.

As a further illustration of the applicability of the principles of the present invention, they may be utilized, for example, in the stabilization or scrubbing of gases for the removal of entrained liquefiable components by absorption, said gases being intimately contacted with the absorber liquid in the manner already described.

The attached diagrammatic drawing (Figures 1 and 2) illustrates two specific forms of apparatus embodying the principles of the present invention.

Referring now particularly to Figure 1, which is a side sectional elevation of one suitable form of apparatus, any suitable liquid may be introduced through line 1 and valve 2 into reservoir 3 wherein a body 4 of said liquid is maintained.

An elongated tube 5 comprises the zone of contact, the lower portion of said tube extending into said body of liquid in reservoir 3. Vapors or gases to be contacted with the liquid may be introduced through line 6 and valve 7 into reservoir 3, an extension 6' of line 6 preferably terminating within tube 5 near its lower or inlet end. Injection of said gases or vapors into the liquid in the lower portion of tube 5 serves to lower the specific gravity of the mixture of liquid and gases or liquid and vapors in tube 5, causing said mixture to pass upward through the tube to be discharged into separator 8. As long as vaporous materials are injected as described and the body of liquid is maintained around the inlet end of tube 5 the operation is continuous; the mixture of vaporous and liquid materials passing continuously upward through mixing zone 5 into separating zone 8. Obviously the length of time during which the liquid and vaporous materials are maintained in intimate contact will depend primarily upon the length of the zone of contact (tube 5) and the velocity of the materials passing through this zone, the latter factor depending primarily upon the velocity of the vapors or gases injected into tube 5 and the cross-sectional area of this zone. Any or all of these factors may be regulated to suit any particular requirement, thus giving any desired contact time. This is an important feature of the invention, especially when highly reactive liquid and vaporous materials are being contacted.

Separator 8 is a zone wherein the vaporous components of the material discharged from tube 5 may separate from its non-vaporous components, the vapors and gases being discharged from the separating zone through line 9 and valve 10. Non-vaporous materials pass from separator 8 through line 11 into a settling chamber 12, where they may be further separated into desirable liquid components and heavier undesirable components. The latter, which may comprise, for example, spent treating reagent, sludge, condensation or polymerization products or the like, may collect in the lower portion of chamber 12 to be withdrawn through line 13 and valve 14. The desirable liquid components, which may comprise, for example, unused treating reagent, may overflow from chamber 12 through line 15 into reservoir 3, commingling in this zone with the fresh liquid supplied to this zone through line 1 and valve 2 to form the body of liquid 4 which is contacted with the vapors or gases from line 6.

Figure 2:
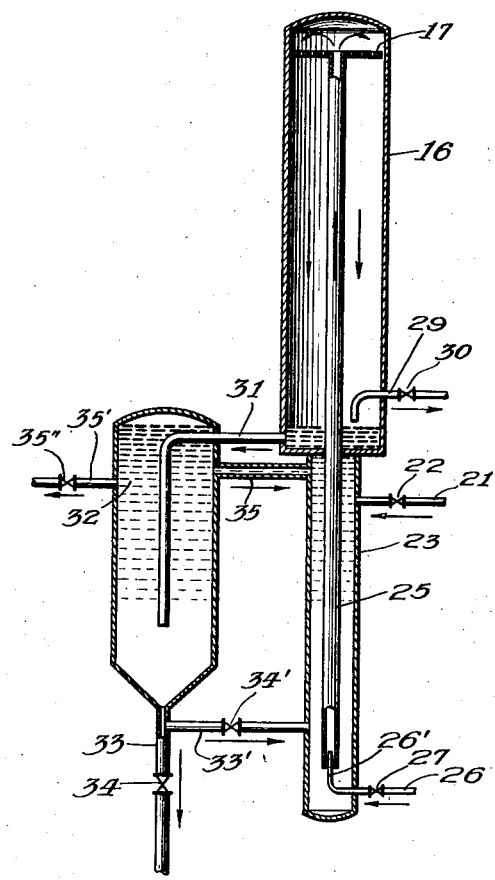

Referring now to Figure 2, which is a side sectional elevation of a somewhat modified form of apparatus, the reservoir surrounding the lower end of the zone of contact is indicated at 23. Fresh liquid may be supplied to this zone through line 21 and valve 22 while vapors or gases are supplied through line 26, valve 27 and extension 26' of line 26. The zone of contact is indicated at 25 and its upper or discharge end terminates in the upper portion of a combined separating zone and zone of further contact which is designated at 16. A suitable distributing arrangement 17 such as, for example, a perforated plate, may be attached to the upper end of tube 25 for the purpose of uniformly distributing the materials discharged from this tube over the cross-sectional area of chamber 16. Vaporous and liquid materials pass downward through chamber 16, being subjected to further contact during this time in this zone. A level of liquid may be retained in the lower portion of chamber 16 for the purpose of maintaining a liquid seal to prevent the passage of vaporous materials through line 31, said vaporous materials being withdrawn from above the surface of the liquid in chamber 16 through line 29 and valve 30. Non-vaporous materials separated from the vapors and gases in chamber 16 pass through line 31 into settling chamber 32 where separation of desirable liquid components and heavier undesirable components is effected, the latter being withdrawn through line 33 and valve 34 while the desirable liquid overflows from chamber 32 through line 35 into reservoir 23.

When it is not desired to return any portion of the liquid in chamber 32 to reservoir 23, this may be avoided by simply maintaining the level of liquid in chamber 32 below line 35. This also applies to the apparatus illustrated in Figure 1 wherein, by maintaining the level of liquid in chamber 12 below line 15, overflow of the light components through line 15 to chamber 3 is prevented.

In case the unspent or partially spent treating reagent is heavier than the spent reagent, sludge and other reaction products from which it is separated in the settling zone, means are provided for withdrawing the latter from the upper portion of the settling zone and directing the usable partially spent treating reagent from the lower portion of the settling zone back to the body of liquid surrounding the inlet end of the contact zone. This is accomplished, in the case of the apparatus illustrated, in Figure 1, by closing valve 14, in line 13, and opening valve 14', in line 13', thus directing the usable material back to chamber 3 while the undesirable components of the liquid in chamber 12 are withdrawn therefrom through line 15' and valve 15'', the liquid level being maintained below line 15. In the apparatus illustrated in Figure 2, line 33' controlled by valve 34' serves as a means of directing the usable components of the liquid from chamber 32 back to chamber 23 while line 35' controlled by valve 35'' serves as a means of withdrawing undesirable components of the liquid from chamber 32.

I claim as my invention:

1. An apparatus for obtaining intimate contact between liquid and vaporous materials and thence separating the products which comprises an elongated contact zone, a closed vessel for maintaining a body of liquid surrounding the inlet end of said contact zone, means for introducing fresh liquid into said vessel, means for injecting vaporous materials into the inlet end of said contact zone beneath the surface of said body of liquid to entrain a portion of said liquid and effect passage of the commingled materials maintained in intimate contact through said contact zone, a separating zone surrounding the outlet end of said contact zone wherein liquid and vaporous materials are separated, a settling zone for separating relatively light and relatively heavy components of the liquid from the separating zone, means for introducing a selected component of said liquid into the body of liquid surrounding the inlet end of said contact zone and means for withdrawing the remaining components of said liquid from the system.

2. An apparatus for treating fluids, comprising in combination, an elongated treating zone of restricted cross-section, an inlet and outlet therefor, means communicating with said inlet for maintaining a treating agent for fluids, means for initially introducing into the inlet of said treating zone concurrently fluid for treatment and a fresh treating agent from said maintaining means, a separating zone surrounding the outlet of said treating zone and means for withdrawing separated materials from said latter zone.

3. An apparatus for treating fluids, comprising in combination, an elongated treating zone of restricted cross-section, an inlet and outlet therefor, means in communication with said inlet for maintaining a treating agent for fluids, means for initially and concurrently introducing into the inlet of said treating zone fresh fluid for treatment and a fresh treating agent from said treating agent maintaining means, a separating zone into which said treating zone outlet discharges, means for removing treated fluid from said separating zone, and means for returning spent treating agent from said latter zone to said treating agent maintaining means.

4. An apparatus for treating fluids, comprising in combination, an elongated treating zone of restricted cross-section, an inlet and outlet therefor, means communicating with said inlet for maintaining a constant source of supply of treating agent for said fluids, means for concurrently introducing into the inlet of said treating zone a fluid for treatment and commingling therewith a treating agent from said source of supply, a separating zone in communication with the outlet of said treating zone, means for removing treated fluids from said separating zone, and means for returning used treating agent to a secondary supply zone in communication with said means for maintaining a constant source of supply of treating agent.

5. An apparatus for treating fluids, comprising in combination, an elongated treating zone of restricted cross-section, an inlet and outlet therefor, means in communication with said inlet for maintaining a constant source of supply of treating agent for said treating zone, means at the inlet of said treating zone for concurrently introducing and commingling fluid for treatment and a treating agent from said source of supply, a separating zone in communication with the outlet of said treating zone, means associated with said separating zone for withdrawing treated fluids, and further means in communication with said separating zone for returning used treating agent to a secondary supply zone in communication with said constant source of supply means, and separate means for withdrawing spent treating agent and heavy reaction products from said secondary supply zone.

6. Apparatus for treating fluids, comprising in combination an elongated treating zone restricted in cross-section, an inlet and outlet for said zone, the inlet thereof being disposed below the liquid level of a container adapted to retain a treating agent, means adjacent said inlet for injecting fluid for treatment into said treating zone and concurrently mixing therewith portions of the reagent within said container, a separating zone disposed at the outlet of said treating zone and into which the mixture of fluid and reagent discharges, and means for withdrawing separated material from said separating zone.

KENNETH M. WATSON.